United States Patent
Bao et al.

(10) Patent No.: US 8,589,427 B2
(45) Date of Patent: Nov. 19, 2013

(54) SENSING AND RESPONDING TO SERVICE DISCOVERIES

(75) Inventors: Zhendong Bao, Marietta, GA (US); William P. Shaouy, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/403,218

(22) Filed: Feb. 23, 2012

(65) Prior Publication Data
US 2012/0158778 A1 Jun. 21, 2012

Related U.S. Application Data

(63) Continuation of application No. 11/846,435, filed on Aug. 28, 2007, now Pat. No. 8,224,840.

(51) Int. Cl.
G06F 17/30 (2006.01)

(52) U.S. Cl.
USPC ........... 707/759; 707/705; 707/722; 707/736; 707/760; 707/769; 707/770; 707/771

(58) Field of Classification Search
USPC ......... 707/705, 722, 736, 758, 759, 760, 769, 707/770, 771
See application file for complete search history.

(56) References Cited

U.S. PATENT DOCUMENTS

| | | |
|---|---|---|
| 5,768,581 A | 6/1998 | Cochran |
| 5,913,215 A | 6/1999 | Rubinstein et al. |
| 6,032,201 A | 2/2000 | Tillery, Jr. et al. |
| 6,578,045 B1 | 6/2003 | Gray et al. |
| 6,789,086 B2 | 9/2004 | Gray et al. |
| 6,857,123 B1 | 2/2005 | Nuxoll et al. |
| 7,379,948 B2 | 5/2008 | Gray et al. |
| 7,565,422 B2 | 7/2009 | Campbell et al. |
| 7,689,552 B2 | 3/2010 | Brealey et al. |
| 7,962,470 B2 | 6/2011 | Degenkolb et al. |
| 7,966,320 B2 | 6/2011 | Roshen |
| 8,224,840 B2 * | 7/2012 | Bao et al. ............... 707/769 |
| 2003/0140119 A1 | 7/2003 | Acharya et al. |
| 2003/0187872 A1 | 10/2003 | Gray et al. |
| 2003/0208595 A1 | 11/2003 | Gouge et al. |
| 2003/0228842 A1 | 12/2003 | Heinonen et al. |
| 2004/0039728 A1 | 2/2004 | Fenlon et al. |
| 2004/0083262 A1 | 4/2004 | Trantow |
| 2004/0230566 A1 * | 11/2004 | Balijepalli et al. ........... 707/3 |
| 2005/0038773 A1 | 2/2005 | Gray et al. |
| 2005/0055421 A1 | 3/2005 | Light et al. |
| 2005/0055422 A1 | 3/2005 | Campbell et al. |
| 2005/0080768 A1 | 4/2005 | Zhang et al. |
| 2005/0102353 A1 | 5/2005 | Murphy et al. |
| 2005/0182825 A1 | 8/2005 | Eytchison |

(Continued)

OTHER PUBLICATIONS

Notice of Allowance dated Mar. 8, 2012 in U.S. Appl. No. 11/846,435.

*Primary Examiner* — Frantz Coby
(74) *Attorney, Agent, or Firm* — John Pivnichny; Roberts Mlotkowski Safran & Cole, P.C.

(57) ABSTRACT

A system and method of sensing and responding to service discoveries on a consumer's machine and, more particularly, to a system and method of sensing (discovering) service needs on a consumer's machine using a resident Daemon, and responding to the service discoveries using an extension of UDDI. The method comprises receiving a keyword from a local machine, locating a service associated with the keyword, and notifying the local machine about the service that matches the keyword.

22 Claims, 3 Drawing Sheets

(56) References Cited

U.S. PATENT DOCUMENTS

| | | |
|---|---|---|
| 2005/0276229 A1 | 12/2005 | Torabi |
| 2005/0289096 A1 | 12/2005 | Trossen et al. |
| 2006/0047619 A1 | 3/2006 | Brealey et al. |
| 2006/0123116 A1 | 6/2006 | Rahman et al. |
| 2006/0161563 A1 | 7/2006 | Besbris et al. |
| 2006/0206440 A1 | 9/2006 | Anderson et al. |
| 2007/0106650 A1 | 5/2007 | Moore |
| 2007/0149191 A1 | 6/2007 | Wu |
| 2007/0282879 A1* | 12/2007 | Degenkolb et al. ........... 707/101 |
| 2008/0310431 A1* | 12/2008 | Nezamzadeh ................ 370/401 |
| 2009/0018998 A1 | 1/2009 | Patten, Jr. et al. |
| 2009/0222541 A1 | 9/2009 | Monga et al. |
| 2010/0088301 A1 | 4/2010 | Zhao et al. |

* cited by examiner

SENSING AND RESPONDING TO SERVICE DISCOVERIES

CROSS-REFERENCE TO RELATED APPLICATIONS

The present application is a continuation application to U.S. application Ser. No. 11/846,435, filed on Aug. 28, 2007, the contents of which are herein incorporated by reference in its entirety.

FIELD OF THE INVENTION

The invention generally relates to a system and method of sensing and responding to service discoveries on a consumer's machine and, more particularly, to a system and method of sensing (discovering) service needs on a consumer's machine using a resident Daemon, and responding to the service discoveries using an extension of Universal Description, Discovery and Integration (UDDI).

BACKGROUND OF THE INVENTION

Universal Description, Discovery, and Integration (UDDI) is a platform-independent, XML-based registry. UDDI is an open industry initiative, which enables companies to publish service listings and define how the services or software applications interact over the Internet. The ultimate goal of UDDI is to streamline online transactions by enabling companies to find one another on the Web and make their systems interoperable for e-commerce.

The UDDI registry service manages information about service providers, service implementations, and service metadata. For example, service providers can use UDDI to advertise their services and service consumers can use UDDI to discover services that suit their requirements and to obtain the service metadata needed to consume those services. Thus, the UDDI depends on the service provider to register its services on the registry.

Currently, many companies maintain a registry such as, for example, International Business Machines, Corp. (IBM). (IBM is a trademark of International Business Machines, Corp. in the United States, other countries, or both.) The IBM registry, for example, is a registry server that is interoperable with servers from other members. In this manner, as information goes into the registry server, servers in other companies or members can share the information.

A UDDI registration typically consists of three components:
  White Pages: address, contact, and known identifiers;
  Yellow Pages: industrial categorizations based on standard taxonomies; and
  Green Pages: technical information about services exposed by the business. UDDI registration is open to companies worldwide.

The UDDI specification utilizes World Wide Web Consortium (W3C) and Internet Engineering Task Force (IETF) standards such as XML, HTTP, and Domain Name System (DNS) protocols. It has also adopted Simple Object Access Protocol (SOAP) messaging guidelines for cross platform programming. For example, the UDDI is designed to be interrogated by, for example, SOAP messages and to provide access to Web Services Description Language documents describing the protocol bindings and message formats required to interact with the web services listed in its directory.

In operation, the UDDI is not a service running on the consumer's machine; instead, the service is running on the Internet. To gain access to the UDDI, the user accesses the UDDI registry via a public address. Once the user gains access to the UDDI, it requests certain services, at which time the UDDI searches its database for such services. The UDDI will then return a list of possible services. In this way, the UDDI relies on the user to proactively determine its service requirements and request such services from the UDDI. This is time consuming and relies very heavily on the user knowing its specific needs.

Accordingly, there exists a need in the art to overcome the deficiencies and limitations described hereinabove.

SUMMARY OF THE INVENTION

In a first aspect of the invention, a method comprises receiving a keyword from a local machine, locating a service associated with the keyword, and notifying the local machine about the service that matches the keyword. In another aspect of the invention, the method comprises searching for keywords on a local machine, providing the keywords to a third party, and receiving notification from the third party that at least one keyword matches a service provided by a service machine.

In yet another aspect of the invention, the method deploys an application for discovering and providing consumer services in a computing environment. The method comprises providing a computer infrastructure being operable to match a keyword received from a local machine to a keyword list maintained by an extension to a UDDI, where the keyword list has keywords which are associated with services offered by one or more service groups. The computer infrastructure is also operable to provide service information that matches the keyword to the local machine.

In another aspect of the invention, a system comprising a server has a database containing data associated with one or more services offered by one or more service group. At least one of a hardware and software component. matches the list of keywords with keywords obtained by a daemon residing on a local machine and provides service information to a local machine associated with the keyword, when a match is found with the keyword.

In another aspect of the invention, a computer program product comprising a computer usable medium having readable program code embodied in the medium is provided. The computer program product includes at least one component to perform the steps of the invention.

DETAILED DESCRIPTION OF EMBODIMENTS OF THE INVENTION

The invention generally relates to a system and method of sensing and responding to service discoveries on a consumer's machine and, more particularly, to a system and method of sensing (discovering) service needs on a consumer's machine using a Daemon residing on the consumer's machine. In implementation, once the service needs are discovered, an extension to the UDDI can provide service information in response to the service discoveries. In this way, the invention improves existing service-oriented architectures and sense-and-respond business processes and technologies by providing sense-and-respond systems which automatically provide services or service information to a consumer machine. The system and method of the invention is platform independent and can be implemented within any database, on a single workstation or provided over a distributed network such as, for example, the Internet and more specifically on the World Wide Web.

In operation, the consumer is automatically notified of new services that may be applicable to the consumer, without requiring the consumer to configure their machines (other than installation). By way of example, the system and method of the invention is configured to sense the consumer's environment, via the use of Daemon (Local Sense-And-Respond Daemon (LSARD)) searching for keywords on the resident machine and, in turn, respond to that environment by way of an extension to the UDDI. The LSARD resides on a local consumer, or client, machine, as part of a Services-Oriented Architecture (SOA).

More specifically, the LSARD is configured to search the local machine for keywords, and notify a Central Service Discovery Program (CSDP) of new or potential services required by the consumer. In embodiments, the CSDP, as an extension of a UDDI, is configured to automatically match the needs of consumer machines with the services of service machines using the keywords. The CSDP works as a message hub in SOA. The CSDP will maintain a list of keywords associated with one or more service groups. It should be understood that the CSDP keeps the service information with multiple attributes about the nature of them such as provider ID, etc. The CSDP, in implementation, is configured to categorize the services into different groups by using any criteria on top of these attributes. In this way, the service group dynamic, existing in the run-time data processing, and all of the services are persistent as siblings in one list. However, in further embodiments, the invention will still work without the concept of groups being introduced; although, grouping services allows the CSDP more flexibility in matchmaking.

Figure 1:
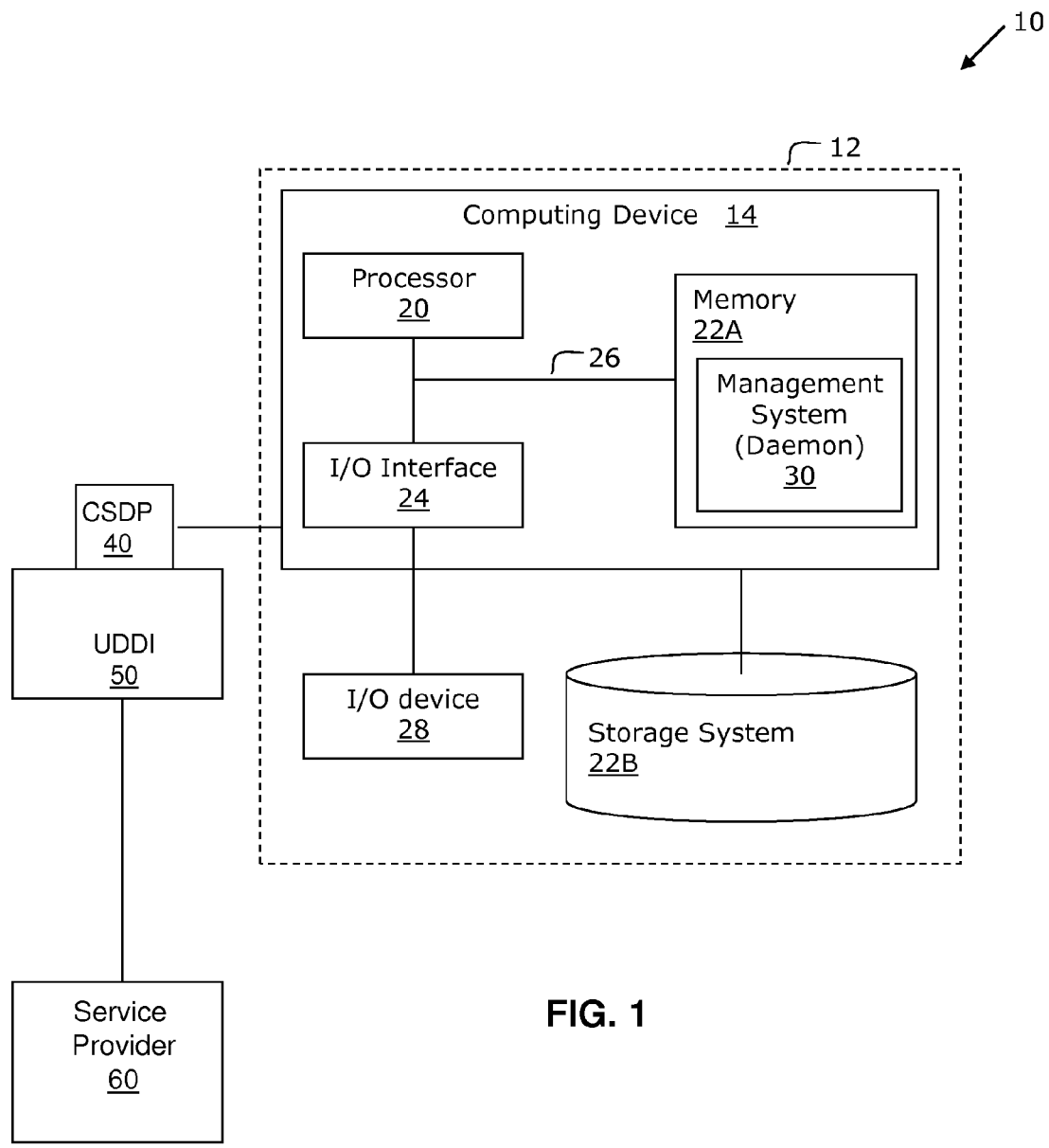
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to discover services that are needed by the consumer, etc. in accordance with the invention, e.g., process described herein. In embodiments, the management system 30 includes a daemon, which resides on the local machine. The daemon 30 is configured to search for keywords on the local machine, and provide such keywords to a Central Service Discovery Program (CSDP) 40. (As discussed in more detail below, the daemon is a sense and discovery system.) The CSDP 40 is an extension of a UDDI 50. The CSDP 50 is also connected to one or more service providers 60.

The computing device 14 includes a processor 20, a memory 22A, an input/output (I/O) interface 24, and a bus 26. Further, the computing device 14 is in communication with an external I/O device/resource 28 and a storage system 22B, as well as the CSDP 50, which is an extension of the UDDI 60.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 (such as, for example, the CSDP 40 and UDDI 50) using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the process steps of the invention on a subscription, advertising, and/or fee basis. That is, a service provider (e.g., CSDP), such as a Solution Integrator, could offer to perform the processes described herein. In this case, the service provider can create, maintain, deploy and/or support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
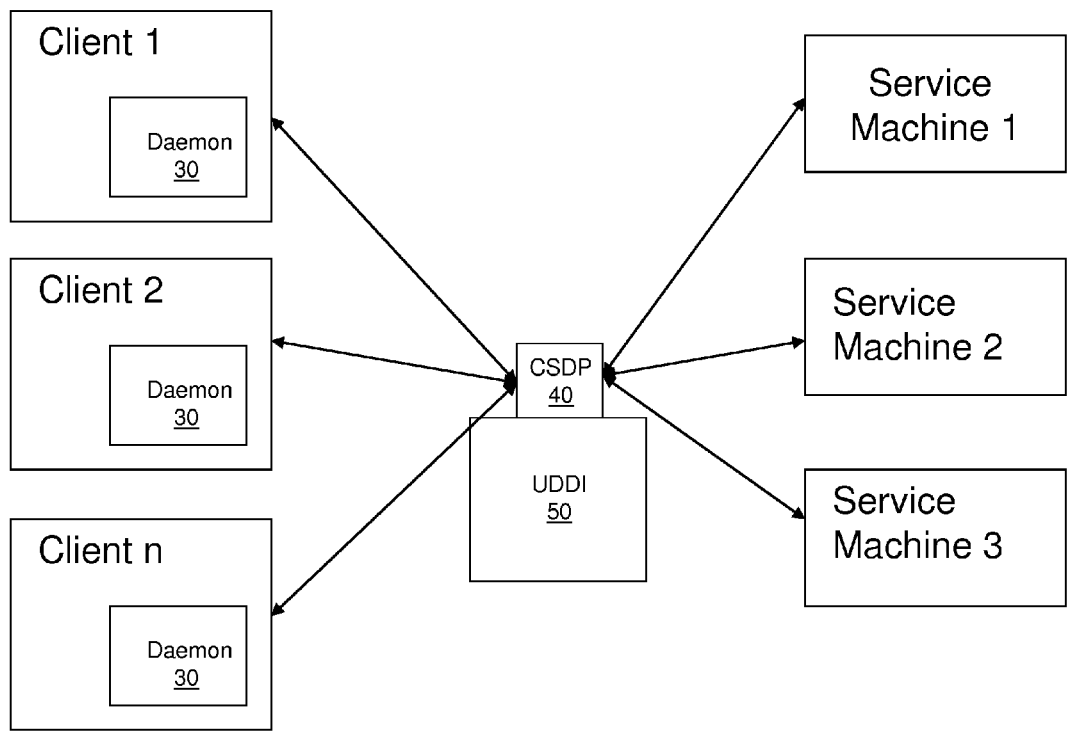
FIG. 2 is a graphical representation of a system in accordance with the invention.

FIG. 2 is a graphical representation of the system in accordance with the invention. This graphical representation is used to discuss the inventive concepts herein and is not meant to be a limiting feature of the present invention. In an embodiment, a CSDP 40 is provided as an extension of a UDDI 50. The CSDP 40 is configured to provide a bridge between the consumer machines 1 through n and the service machines, 1 through 3, and is further configured to match services to the consumers' needs. Although three consumer machines and service machines are illustrated, it should be understood that more or less than three consumer machines and service machines are contemplated by the invention. In implementation, the CSDP 40 maintains a set of service lists, where each list is for each service group connected to the CSDP 40. For each service in a service list, a set of keywords is maintained. The keywords may be provided by the UDDI, the service machines or generated internally.

Still referring to FIG. 2, each consumer (or client) machine includes a Local Sense-And-Respond Daemon (LSARD) 30. The LSARD 30 resides on each consumer machine and is configured to be a local search program. For example, the LSARD 30 is configured to discover the needs of the consumer machine and to notify the CSDP 40 of new potential needs of the consumer, via the use of keywords found on exposed data sources.

By way of illustration, the LSARD 30 is configured to search the local machine for keywords, which is to be maintained in a master keyword list. The master keyword list is preferably resident on and maintained by the CSDP 40, for example. In embodiments, the LSARD 30 searches all exposed data sources (applications and files) for keywords, or words that were not previously found in prior searches. The exposed data sources may be email or other applications in addition, to or alternatively, content files (e.g., html, pdf, .doc, etc.). In further embodiments, the LSARD 30 may search for only certain keywords, which are maintained and provided by the CSDP 40. In either scenario, the keywords are provided to the CSDP 40 in order to determine if there are any available services.

In operation, the LSARD 30 will search its local machine for new keywords on a periodic basis, such as, for example, daily, hourly, etc. As such, the LSARD 30 can search its local machine on any predetermined schedule. In this manner, the keyword search can be easily managed, since it is conducted on a regular basis. That is, since the keyword search is conducted on a regular basis, only a limited number of keywords will typically be found. In implementation, there is no need to index the entire local machine.

Once a keyword (or keywords) is found, the LSARD 30 will provide the keyword to the CSDP 40. The CSDP 40 will index the keyword, and compare the keyword to the keywords maintained in the set of service lists of the CSDP 40, for each service group connected to the CSDP 40. In embodiments, the index can be refreshed with the found keywords, as well as any new keywords provided by the service machine or UDDI. Once refreshed, the CSDP 40 will determine if there are any matches between the keyword(s) found on the consumer machine and the keywords maintained in the set of service lists. The keyword from either the local machine or the service machine may be provided via any known mode of communication, preferably email, to the CSDP 40.

If a keyword match is found, the CSDP 40 is configured to determine which service machine provides a service matching the keyword found on the local machine. Once the CSDP 40 determines the matching service provider, in embodiments, the CSDP 40 will provide connection information of the service machine to the local machine. In alternative embodiments, the CSDP 40 may act as a conduit between the CSDP 40 and the local machine, by providing the service directly to the local machine via the service machine. In either embodiment, the CSDP may act as a service provider, providing the information or service, itself, on a fee or subscription basis.

In further embodiments, the CSDP 40 may maintain a database of the keywords provided by the local machine. If a keyword match is not initially found, in embodiments, the CSDP 40 may periodically search its database for matches. That is, when additional or new services are listed in the UDDI 50, the CSDP 40 may update its master keyword list with keyword(s) associated with such services. The CSDP 40 may then periodically search its database to determine if there are any matches with the new or additional services and the keywords (found on the consumer machine) already stored within its database. If any matches are found (e.g., with the saved keywords and the keywords associated with new services in the master keyword list maintained by the CSDP 40), the CSDP 40 will provide connection information of the service machine having the new or additional service to the local machine. In alternative embodiments, the CSDP 40 may provide the service directly to the local machine.

In still alternative embodiments, the CSDP 40 may provide the keywords found on the local machine(s) to an appropriate (any or all) service machine. The service machine may use this information to create new services. The new services, which match the keyword, may then be provided to the local machine associated with the keyword, in the manner described above. In yet further embodiments, the CSDP 40 may provide the keyword information to an appropriate (any or all) service machine only after a predetermined number of the same or similar keywords are found on a number of local machines. In this implementation, for example, the keywords will be provided to the service machine only after a set threshold number of keywords, e.g., 10, are found on the local machines. In still further embodiments, the CSDP 40 may send out a query to other service machines, in an attempt to locate a service matching the keyword(s).

In operation, the LSARD 30 runs as a low priority process. Also, the LSARD 40 periodically polls its local machine, as discussed above, to find keywords. This may include, for example, decompiling all deployed code, except where specified by the owner, and scan the codes for keywords. The LSARD 30 can also scan any exposed content files (e.g., html, pdf, .doc, etc) for new keywords. All new keywords can be added to its master keyword list, checking for duplicates prior to placing the new keywords into the master keyword list. More particularly, when the LSARD is first-time deployed, the following steps are contemplated by the invention:

(i) scan its host machine for executable files, except where specified by the machine owner;

(ii) decompile all the files above, and assemble a list of all the non-trivial words (an example of a trivial word may be, for example, "a", "the", etc., plus programming keywords such as "if", "while", etc.). This will be the beginning of the keyword list of the LSARD.

(iii) scan all content files (html., pdf., doc., etc.) for new keywords, and add the new keywords to the list of the LSARD, if not already present.

Figure 3:
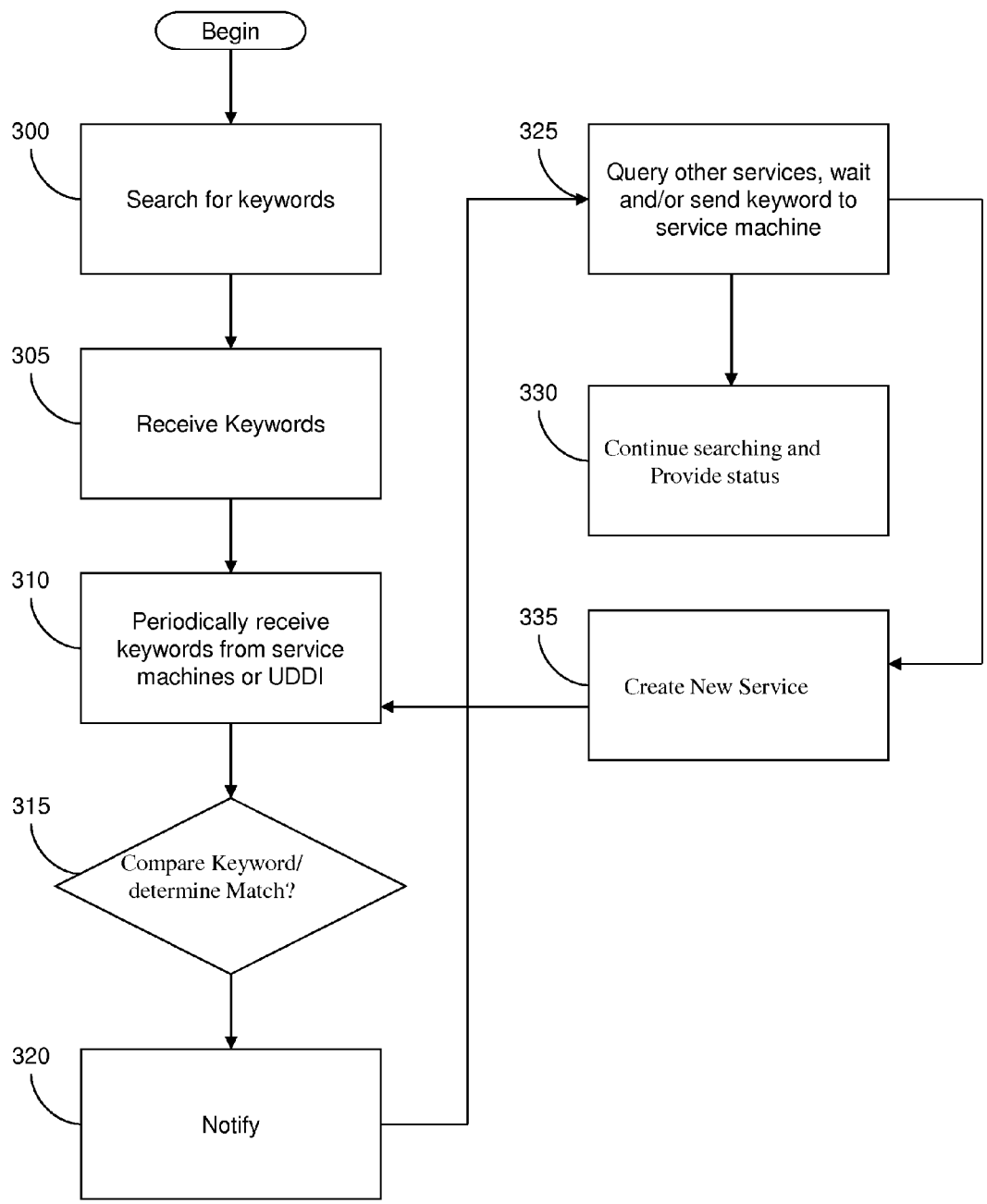
FIG. 3 is a flow chart of steps for implementing aspects of the invention.

FIG. 3 is a flow diagram implementing steps of the invention, which may be, implemented in the environment of FIGS. 1 and/or 2. FIG. 3 may equally represent a high-level block diagram of the invention. The steps of FIG. 3 may be implemented and executed from either a server, in a client server relationship, or they may run on a user workstation with operative information conveyed to the user workstation to balance workload. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

Referring back to FIG. 3, at step 300, the processes of the invention begin searching for keywords on exposed portions (applications, files, etc.) of the local machine. This may be performed on a periodic basis, e.g., predetermined basis. The keywords may be any words found in the exposed portions of the local machine, or provided by a third party source such as, for example, the CSDP. At step 305, the keywords are received by the CSDP, indexed, and if necessary, the index is refreshed. At step 310, periodically, the CSDP may receive keywords from the service machines, which are maintained in the master keyword list for each service group. The process of step 310 may be performed simultaneously or concurrently with the processes of steps 300 and 305.

More specifically, in embodiments, at step 310, the CSDP, for each service group, polls the service group to see if any new service was created. For every new service, the CSDP adds the new service to CSDP service list for the service group, and the CSDP retrieves the list of new keywords associated with the new service, either from the service machine, itself, or the UDDI. At step 315, the CSDP compares the list of new service keywords to the keywords received from the local machines. At step 320, for every keyword match, the CSDP automatically notifies the customer of the existence of the new service, if not already notified, and, in embodiments, the connection information of the respective service machine offering such service. This notification may be sent to the customer by email, telephone or other known methods. In embodiments, the local machine directly connects to the respective service machine or, alternatively, the CSDP will provide the connection directly to the service machine.

If there are no matches found at step 320, at step 325, the CSDP may query other services, wait a predetermined amount of time to again query its database to determine new matches and/or send the keyword(s) to the service provider. If there are no matches, the process may continue in a loop until a service is provided or found, while keeping the local machine updated of the status, at step 330. Alternatively, at step 335, if there are no matches, the service provider may create a new service that matches the keyword. The process would continue at step 310.

While the invention has been described in terms of embodiments, those skilled in the art will recognize that the invention can be practiced with modifications and in the spirit and scope of the appended claims.

What is claimed is:

1. A method, comprising:
   receiving a keyword from a daemon residing on a local machine, wherein the keyword is found by the daemon during a periodic searching of the local machine for keywords contained in a master keyword list;
   locating a service associated with the keyword; and
   notifying the local machine about the service that matches the keyword,
   wherein the receiving, the locating, and the notifying are performed by a third party computing device that is external to the local machine and that provides a bridge between the local machine and a plurality of service machines.

2. The method of claim 1, wherein the locating comprises searching for a match of the keyword in a list of keywords maintained by a Central Service Discovery Program (CSDP) that is an extension to a Universal Description, Discovery, and Integration (UDDI).

3. The method of claim 2, wherein the list of keywords is provided by the UDDI or a service machine.

4. The method of claim 2, wherein the list of keywords is maintained for each of one or more service groups connected to the CSDP.

5. The method of claim 2, wherein the list of keywords is periodically polled to determine new matches with the keyword.

6. The method of claim 2, wherein the CSDP further performs the steps:
   providing the master keyword list to the daemon;
   maintaining a database of found keywords obtained from the local machine;
   updating the list of keywords as a result of additional or new services listed in the UDDI;
   periodically searching the database for matches between the additional or new services and the found keywords stored in the database;
   automatically providing service information to the local machine based on a match found during the periodic searching; and
   providing keyword information to a service machine after a predetermined number of a same keyword is received from a plurality of local machines including the local machine.

7. The method of claim 1, wherein the notifying includes automatically providing connection information to a service machine offering the service.

8. The method of claim 1, further comprising providing the keyword found on the local machine to a service machine.

9. The method of claim 8, wherein the providing is performed after a predetermined number of a same keyword is received.

10. The method of claim 1, further comprising polling one or more service groups to determine whether any new services were created.

11. A method for deploying an application for discovering and providing consumer services in a computing environment, comprising:
    providing a computer infrastructure being configured to:
       provide a master keyword list to a daemon residing on a local machine, wherein the daemon is configured to periodically search the local machine for keywords contained in the master keyword list;
       match a keyword received from the daemon of the local machine to a keyword list maintained by a third party computing device external to the local machine, the keyword list having keywords which are associated with services offered by one or more service groups; and
       provide service information which matches the keyword to the local machine,
    wherein the third party computing device provides a bridge between the local machine and a plurality of service machines.

12. The method of claim 11, wherein the third party computing device includes a Universal Description, Discovery, and Integration (UDDI) and Central Service Discovery Program (CSDP).

13. The method of claim 12, wherein the keyword list is provided by the UDDI or a service machine associated with one or more of the service groups.

14. The method of claim 11, wherein the computer infrastructure is configured to maintain the keyword list for each service group connected to the extension.

15. The method of claim 11, wherein the computer infrastructure is configured to index the keyword prior to the matching.

16. The method of claim 11, wherein the computer infrastructure is configured to periodically poll the keyword list to determine if there are any new matches with the keyword found on the local machine.

17. The method of claim 11, wherein the computer infrastructure is configured to automatically provide connection information to the service machine offering the service.

18. The method of claim 11, wherein the computer infrastructure is configured to provide the keyword to a service machine after a predetermined number of a same keyword is received.

19. The method of claim 18, further comprising polling the one or more service groups to determine whether any new services were created.

20. A system comprising:
a server providing a bridge between a client machine and a plurality of service machines, the server being configured to:
maintain a plurality of keywords sets for a respective a plurality of service groups connected to the server via the plurality of service machines;
maintain a master keyword list of client keywords received from the client machine, the client keywords being obtained from exposed data sources of the client machine by a Local Sense-And-Respond Daemon (LSARD) residing on the client machine;
determine a match between one of the client keywords and a service keyword maintained in a first keyword set of the plurality of keyword sets, the first keyword set corresponding to a first service group of the plurality of service groups;
determine a first service machine of the plurality of service machines that connects the first service group to the server; and
provide connection information for the first service machine to the client machine.

21. The method of claim 1, wherein the notifying the local machine comprises:
determining a first service machine of the plurality of service machines that connects the service to the third party computing device; and
providing connection information for the first service machine to the local machine.

22. The method of claim 11, wherein the computer infrastructure is configured to provide the service information by:
determining a first service machine of a plurality of service machines that connects a first service group of the one or more service groups to the third party computing device; and
providing connection information for the first service machine to the local machine.

* * * * *